United States Patent [19]

Esparza Olcina

[11] Patent Number: 5,450,311
[45] Date of Patent: Sep. 12, 1995

[54] STATIC ENERGY REGULATOR FOR LIGHTING NETWORKS WITH CONTROL OF THE QUANTITY OF THE INTENSITY AND/OR VOLTAGE, HARMONIC CONTENT AND REACTIVE ENERGY SUPPLIED TO THE LOAD

[75] Inventor: Rafael Esparza Olcina, Alcoy, Spain

[73] Assignee: Ingenieria de Sistemas de Control, S.A., Alcoy, Spain

[21] Appl. No.: 157,985

[22] Filed: Nov. 24, 1993

[30] Foreign Application Priority Data

Nov. 27, 1992 [ES] Spain .................... 9202407

[51] Int. Cl.6 ............................. H02M 5/46
[52] U.S. Cl. ..................... 363/79; 323/207; 363/34; 363/37; 363/95
[58] Field of Search ............ 323/205, 207; 363/34, 363/37, 41, 95, 97, 137, 79

[56] References Cited

U.S. PATENT DOCUMENTS

| | | | |
|---|---|---|---|
| 4,800,478 | 1/1989 | Takahashi | 363/41 |
| 4,879,639 | 11/1989 | Tsukahara | 363/37 |
| 4,887,007 | 12/1989 | Almering et al. | 375/243 |
| 4,934,822 | 6/1990 | Higaki | 363/37 |
| 5,777,374 | 5/1992 | Lai et al. | 363/37 |

FOREIGN PATENT DOCUMENTS 498651 2/1992 European Pat. Off. .

OTHER PUBLICATIONS

"A Controlled Current Inverter for Active Distortion Compensation and Power Factor Correction" (IECON '91, Oct. 18, 1991, pp. 735-740).
"A Fast-Response High Power Factor Converter with a Single Power Stage" (PESC'91, Jun. 27, 1991, pp. 769-779).

*Primary Examiner*—Peter S. Wong
*Assistant Examiner*—Shawn Riley
*Attorney, Agent, or Firm*—Darby & Darby

[57] ABSTRACT

A static energy regulator for lighting in the form of a device that is inserted between the feed and the load has a converter, connected to the load and to a controller, so that the intensity signal through it follows the form of an indication signal. Another converter, connected to the feed and to another controller, supplies an intensity signal that follows the form of another recognition signal proportional to the voltage of a condenser connected between the two converters. Thus it is possible to control the energy flux, to keep consumption at the desired value, compensate for variations of the power supply, reduce costs and lengthen the life of the load. The regulator can be applied to any charge whether or not it is linear and regardless of power factor. In application thereof to lighting it permits the reduction of the luminous flux thus overcoming the inadequacies of previous systems and effectively controlling the characteristics of the energy supplied.

13 Claims, 2 Drawing Sheets

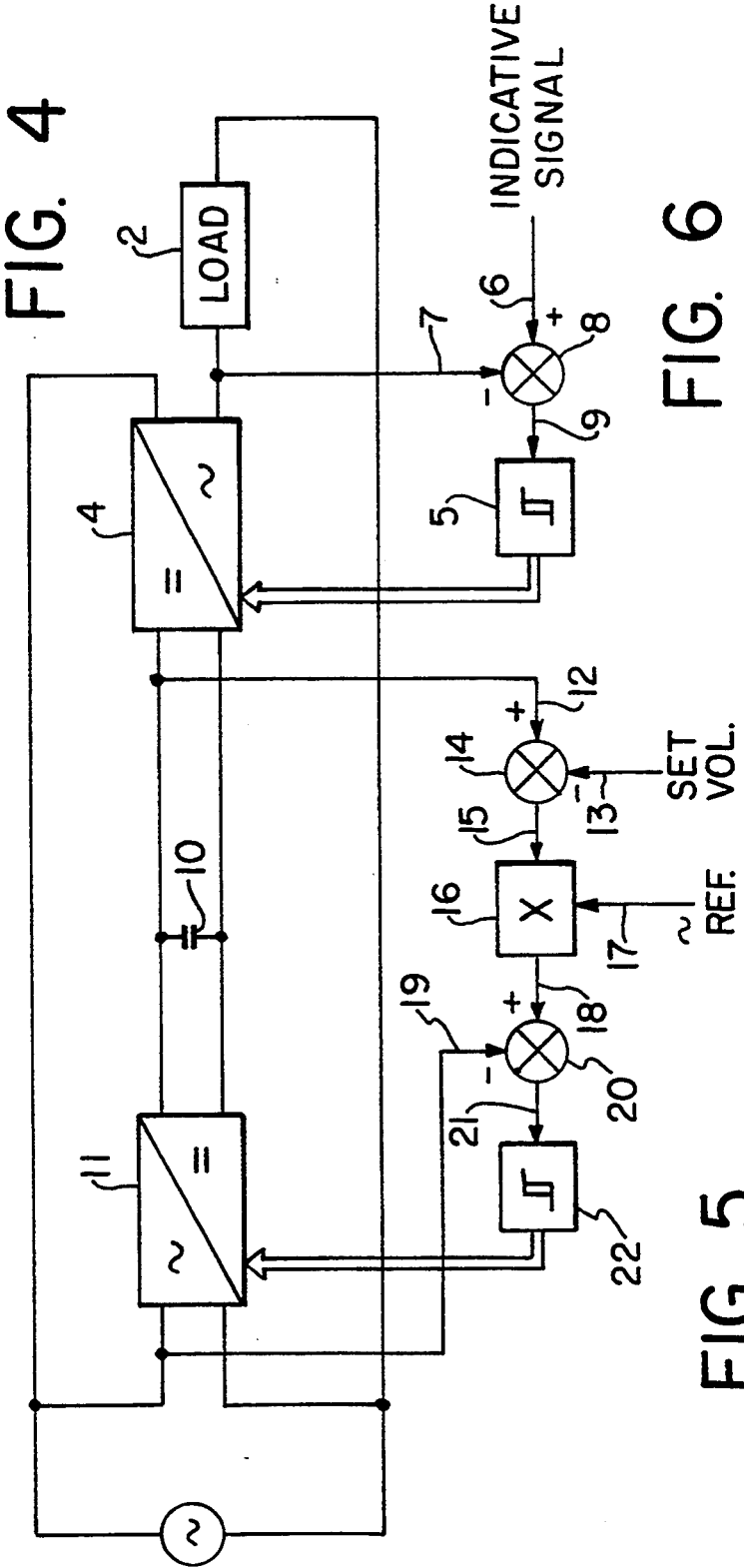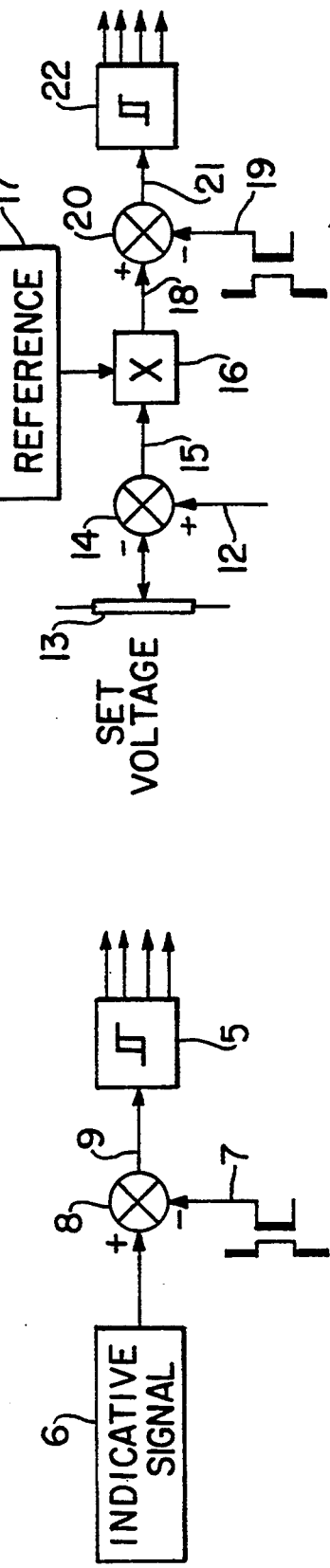

STATIC ENERGY REGULATOR FOR LIGHTING NETWORKS WITH CONTROL OF THE QUANTITY OF THE INTENSITY AND/OR VOLTAGE, HARMONIC CONTENT AND REACTIVE ENERGY SUPPLIED TO THE LOAD

OBJECT OF THE INVENTION

As indicated by the title of the specification, the present invention refers to a static energy regulator for lighting networks with control of the quantity of the intensity and/or voltage, harmonic content and reactive energy supplied to the load. It consists of a static feed system whose purpose is to totally control the characteristics of the energy supplied to an electric load. These characteristics are:

The effective value and the intensity of the current;
The waveforms, and therefore the harmonic content;
The power factor, and therefore the reactive energy.

This invention is developed specifically for the control of the energy supplied to street lighting networks, nonetheless, it can be generally applied to any type of loads whether or not they are linear, and regardless of power factor.

BACKGROUND OF THE INVENTION

Voltage rises in the electric supply of lighting networks have very detrimental effects, on the expenditure of energy consumed, as well as on a notable reduction of the life of lamps. These instabilities tend to take place when there is less consumption, and coincide precisely with the time when the street lighting operates.

On the other hand, it has been verified that it is possible to slightly reduce the luminous flux supplied to the streets when there is less traffic and less people, without any deterioration in the quality of the lighting or, therefore, of the safety of streets.

This reduction of luminous flux is basically carried out by means of two systems: reduction in each light spot or generally in the head of each lighting sector.

Adjustment in the light spot is done by means of the installation, in each luminaire, of special double level reactors switched by a relay. The operation of this relay can be done from the control panel of the lighting sector by means of special wiring, or else by installing an electronic timer in each light spot. If it is done from the control panel of the sector, there is the inconvenience of the need for additional wiring, while, if it is done by means of a timer, there is the inconvenience of the difficulty and little flexibility in programming each individual timer.

Adjustment at the head of the feed voltage of an entire sector is done by means of autotransformers whose dimensions and weights are very high, which implies a serious difficulty for the installation in control panels. Additionally, the presence of moveable electromechanical components reduces the reliability of equipment that is to operate in adverse environmental conditions.

All of this has brought about the development of static adjustment equipment with such advantages as the absence of moveable parts, a smaller size and lighter weight, lower cost, and more rapid, more versatile control.

Up to now, the static equipment designed for this purpose has suffered from inconveniences that have hampered the operation thereof. On the one hand, the systems used to adjust incandescent lamps or, in general, resistive loads, and based on the phase control of a triac or of the thyristors mounted antiparallel, cause a significant deformation of the current waves, which, in the case of discharge lamps, result in the malfunctioning of the lamps and even the untimely switching off thereof. On the other hand, the power factor of the installation is considerably worsened and variably depends on the adjustment spot, which makes it very difficult to balance it by means of compensation.

Other recent innovations are covered by the following patents:

U.S. Pat. No. 4,924,150 "POWER-LINE CONTROL SYSTEM," teaches a device that is inserted between the feed source and the load and that permits the control of the waveform of the current supplied, but without any contribution or reduction of active energy.

In other words in that system, the inverter placed between the feed and the load does not contribute to or absorb net energy from or towards the d.c. feed thereof, without the energy absorbed in certain parts of the feed cycle being returned in others, for the purpose of controlling the waveform of the current.

French patent 2,668,674 "CIRCUIT DE REGLAJE D' INTENSITE LUMINEUSE POUR INSTALLATION D'ECAIRAGE UTILISANT DES LAMPES OU TUBES A DECHARGE," teaches an adjustment system comprised of a three-phase transformer series connected between the feed phases and the load. The secondary of this transformer is connected to a diode rectifier, that provides continuous current, which, by means of a thyristor controlled bridge, is returned to the input through some reactors. This assembly, according to the specification of said patent, varies the effective value of the voltage delivered to the lamps, but maintains the crest value constant.

The most important technical differences of the regulator proposed with regard to these two systems are the following:

With regard to the first one, it likewise permits the control of the waveform of the current delivered to the load, but it also permits absorbing or contributing net active energy from or towards the output that is subsequently reinjected into the input.

With regard to the second one, the proposed system permits the application thereof to a single feed phase, and, on the other hand, permits the control of the waveform of the load intensity virtually at any desired value, instantly.

DESCRIPTION OF THE INVENTION

In order to attain the objectives and to prevent the inconveniences indicated in the above paragraphs, the invention consists of a static energy regulator for lighting networks which controls the quantity of the intensity and/or voltage, harmonic content and reactive energy supplied to the load, that controls the waveform of the intensity delivered to the load and that therefore achieves the control of the value of active energy supplied to the load, and the compensation of the power factor of the load, invalidating the reactive energy consumed. All of this permits the energy consumption to be kept at the desired value thus compensating for variations in the supply, lengthening the working life of the lamps, and reducing the service operating cost.

The equipment of the invention consists of a device that is inserted between the feed network and the load. This device has to be capable of controlling in an exact manner the intensity that flows through it, the quantity, as well as waveform, and phase. If the in-phase sinusoidal intensity is controlled with the feed and observing the corresponding voltage and intensity vector diagrams, for inductive loads as well as for capacitive loads, it is observed that said device supplies the reactive energy required for the load, whereby the power factor thereof is compensated for, so that, from the feed source, the intensity is always in phase with the voltage. Besides, the active energy consumed by the cited device is converted into current also in phase with the feed voltage and returned to the input. This means that, except for losses of the device, the feed source provides only the net active energy required by the load, without delivering any reactive energy.

The device which is to be described in detail below has a converter, connected to the load, operating in accordance with the voltage source method, and with high frequency pulse width modulation. This converter is capable of controlling the energy flux through it in the four quadrants of the voltage-current plane, by means of a hysteresis controller.

This controller permanently compares the value of an indicative wave with the real intensity wave that flows through the converter.

In terms of the instant differences between the indicative wave and the real intensity wave, the controller modulates the triggering of the semiconductors of the converter so that the real intensity closely follows the indicative waveform.

The device has another converter identical to the previous one but parallel connected to the feed voltage, so that it can absorb or inject intensity into it.

From the point of view of the energy balance, the reactive energy is converted into a flow of current to and from a continuous current capacitor connected between the two converters, increasing the voltage of said capacitor in some parts of the cycle and reducing it in others, but with a null net energy balance. However, the active energy is converted into a positive net increase of voltage in the capacitor, if it is absorbed by the converter connected to the load, and is converted into a net reduction of voltage, if it is conveyed by said converter.

The voltage in the capacitor is compared with a set value, and the difference is applied to a multiplier that amplifies a sinusoidal reference which is in phase with the feed. If the voltage in the condenser rises, the difference applied to the multiplier and which modulates the sinusoidal reference, causes an intensity indication determined by the output of this multiplier to increase; while if the voltage in the capacitor is low, the difference applied to the multiplier makes said intensity indication drop.

This indication of intensity is compared with the real intensity supplied by the converter connected to the feed, modulating the triggering of the semiconductors thereof, so that the real intensity accurately follows the waveform of the indication of intensity.

Thus, an active energy flux towards the capacitor makes the intensity injected in the input of the system increase, while a negative energy flux makes the direction of said intensity reverse. Therefore, the active energy that is taken from the system in the converter connected to the load is reinjected in the input of the converter connected to the feed. On the contrary, if it is necessary to furnish active energy to the system by the converter connected to the load, to keep the output intensity set, this energy is absorbed at the input by the converter connected to the feed.

Therefore, the energy flux that is supplied to the load is perfectly controlled, controlling all of the characteristics thereof. In the case of lighting networks, the system allows the voltage or intensity supplied to the lamps to be controlled, having an effect on the input only the required active net energy, and generating inside the reactive energy; whereby the advantages of lower consumption and longer working life of the lamps is achieved, reducing the operating cost of said lighting networks.

Hereinafter, to provide a better understanding of this specification and forming an integral part of the same, some figures in which the object of the invention has been represented in an illustrative and non-restrictive manner are attached hereto.

BRIEF DESCRIPTION OF THE FIGURES

FIG. 4 is an electric diagram of the static energy regulator of the present invention for a phase of the feed voltage.

FIG. 5 is an electrical diagram showing the control signals used to trigger the semiconductors of the first converter.

FIG. 6 is an electrical diagram showing the control signals used to trigger the semiconductors of the second converter.

DESCRIPTION OF AN EMBODIMENT OF THE INVENTION

Hereinafter a description is made of an embodiment of the invention mentioning the references used in the figures.

Hence, the static energy regulator for lighting networks with control of the quantity of the intensity and/or voltage, harmonic content and reactive energy supplied to the load, of this embodiment, consists of a device (1) that is inserted between the load (2) and the feed (3) so that the voltage drop UC in device (1) plus the voltage drop UL in the load (2), is equal to the voltage UE of the feed (3); and the intensity IC of the device (1) plus the intensity IE of feed (3), is equal to the intensity IL in the load (2.)

Device (1) is capable of controlling the intensity IL in the load (2) that passes through it. This control refers to the quantity, as well as to the waveform and to the phase. When this intensity IL is sinusoidal, it is in phase with the voltage UE of the feed (3), and W being the shift between said voltage UE and voltage UL in the load (2), a vector diagram like the one of FIG. 2 is obtained when the load (2) has an inductive cos W; while if the load (2) has a capacitive cos W, a vector diagram like the one in FIG. 3 is obtained.

Figure 1:
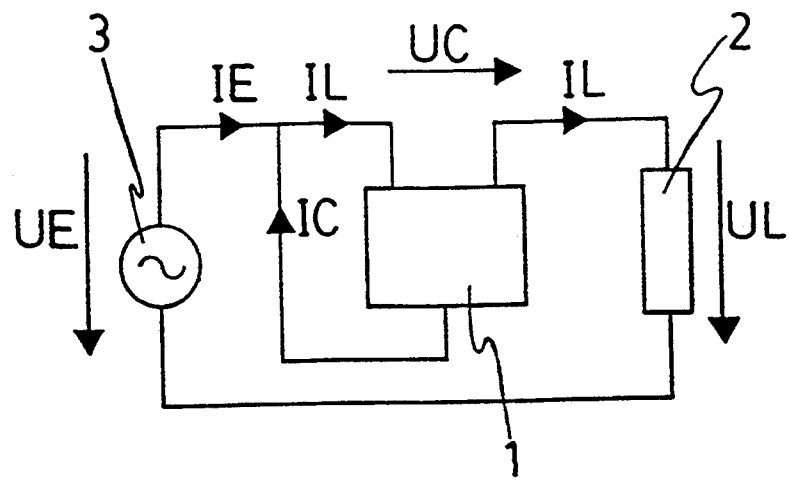
FIG. 1 is a simplified electric diagram of the static energy regulator of the invention, showing its operating principle for a single phase of feed voltage.
Figure 2:
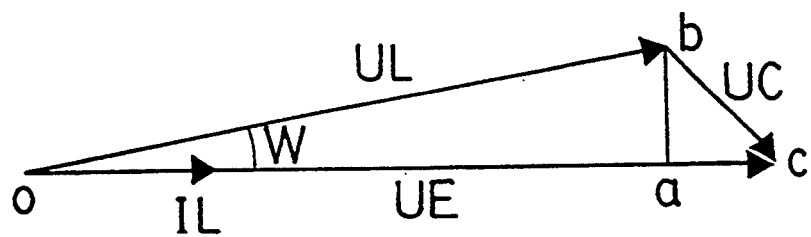
FIG. 2 is a vector diagram of the voltages of the circuit of FIG. 1 for an inductive load.
Figure 3:
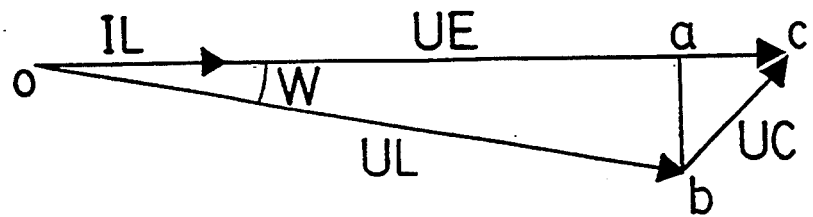
FIG. 3 is a vector diagram of the voltages of the circuit of FIG. 1 for a capacitive load.

In both cases, in other words, in FIG. 2 as well as in FIG. 3, the power consumed by load (2) is represented by segment o-a in the active part thereof, and by segment a-b in the reactive part thereof. The power absorbed by device (1) remains represented by segment a-c in the active part thereof and by segment b-a in the reactive part thereof. This means that, in both cases, device (1) supplies the reactive energy necessary for the load (2), whereby the power factor thereof is compensated for, so that from the feed source (3), the intensity IE and the voltage UE are always in phase; and the active energy consumed by the device (1) is converted into current IC, which is also in phase with the voltage UE and returned to the input.

Therefore, with the exception of the losses of device (1), the feed source (3) only delivers the net active energy required by the load (2), and no reactive energy.

Hereinafter the structure and operation, for a feed source (3), of the cited device (1) in this embodiment of the invention is explained.

The components of the device (1) and the connections thereof to the load (2) and to the feed source (3) are illustrated in FIG. 4.

Said device (1) has a converter (4) connected to the load (2) and that operates according to the voltage source method (VSI=Voltage Source Inverter), and with high frequency pulse width modulation (PWM=Pulse Width Modulation.)

This converter (4) is capable of controlling the energy flux through it in the four quadrants of the V-I plane, by means of connection thereof to a hysteresis controller converter 5. Said controller 5 continuously compares the value of an indicative wave (6) with the real intensity wave (7) that flows through the converter (4.). In terms of the instantaneous differences (9), obtained by the subtractor (8), between said signals (6) and (7), the controller (5) modulates the triggering of the semiconductors of the converter (4) so that signal (7) correctly follows the waveform of the indicative signal (6). This is shown in more detail in FIG. 5.

In the energy balance, the reactive energy converts into a flow of current to and from a capacitor (10) of direct current connected to the converter (4), increasing the voltage thereof in some pans of the cycle and reducing it in others, but with a null energy balance. Nonetheless, the active energy converts into a positive net increase of voltage in the capacitor (10) when it is absorbed by the converter (4) and a net reduction when it is conveyed by the converter (4.)

The device (1) also has another part comprised of another converter (11) identical to the converter (4) but parallel connected to the feed (3), so that it can inject or absorb intensity therein or therefrom.

The voltage (12) in the capacitor (10) has subtracted from it a set voltage (13) by subtractor (14.) The difference (15) between said voltages (12) and (13) is applied to a multiplier (16) so as to modulate a sinusoidal reference (17) in phase with the feed (3.) If the voltage (12) in the capacitor (10) rises, the difference signal (15) or error signal which modulates the sinusoidal reference (17) makes the output signal of the multiplier (16) rise, which is another intensity indicative signal (18.) On the contrary, if the voltage (12) in the capacitor (10) drops, the difference signal (15) causes the intensity indicative signal (18) to drop.

This indicative signal (18) is compared with the real intensity (19) that the converter (11) supplies, both signals (18) and (19) being applied to a substractor (20.) The difference (21) between them is applied to another hysteresis controller (22) which is connected to converter (11) and is responsible for modulating the triggering of the semiconductors thereof so that the real intensity (19) correctly follows the waveform of the indicative signal (18.) This is shown in more detail in FIG. 6.

The result of the configuration and the operation that have been put forth consists of an active energy flux towards the capacitor (10) which causes the intensity (19) injected in the input of the system to rise, while a negative energy flux reverses the direction of this intensity (19.) Therefore, the active energy that is from the system in the converter (4) is reinjected into the input of the converter (11.) Nonetheless, when it is necessary to provide active energy to the system by the converter (4) to keep the output intensity (7), this energy is absorbed at the input by the converter (11.) Thus, the energy flux that is supplied to the load (2) is perfectly controlled in all of the characteristics thereof.

What is claimed:

1. Static energy regulator for lighting networks, having control of the quantity of the current and/or voltage, harmonic content, and reactive energy supplied to the load, comprising an electronic device that is inserted between a load and a feed voltage source, said electronic device comprising:
   a first converter connected to the load;
   a second converter connected to the feed voltage source;
   a first control circuit connected to the first converter to control the operation of the first converter, the first control circuit adapted to receive a first reference signal indicative of a desired waveform to be applied to the load; and
   a second control circuit connected to the second converter to control the operation of the second converter, such that power can be transferred from the first converter to the second converter, from the second converter to the first converter, from the first converter to the load, and from the second converter to the feed voltage source.

2. Static energy regulator according to claim 1, wherein the first converter is connected in series with the load.

3. Static energy regulator according to claim 2, wherein the second converter is connected in parallel with the feed voltage source.

4. Static energy regulator according to claim 3, further including a capacitor connected between the first converter and the second converter, such that a voltage across the capacitor is determined based on the transfer of active power between the feed voltage source and the load.

5. Static energy regulator according to claim 2, wherein the first control circuit comprises:
   means for comparing an actual current signal supplied to the load, with the first reference signal, and producing a first output signal which is applied to the first control circuit for providing control signals which control the operation of the first converter.

6. Static energy regulator according to claim 5, wherein the second control circuit comprises:
   means for providing a second output signal which is a function of the voltage across the capacitor; and
   means for comparing the second output signal with an actual current signal supplied to the feed voltage source from the second converter.

7. Static energy regulator according to claim 6, wherein the means for providing the second output signal comprises:
   means comparing the voltage across the capacitor with a reference voltage for producing a third output signal proportional to the difference between said capacitor voltage and said reference voltage; and a multiplier having a first input and a second input, the first input being connected to receive said third output signal, the second input being connected to receive a second, sinusoidal reference signal which is in phase with the feed voltage, said multiplier producing the second output signal.

8. Static energy regulator according to claim 7, wherein the second control circuit comprises:

means for comparing said second output signal with a signal corresponding to real current supplied to the feed voltage source by the second converter, and producing a fourth output signal based on said comparison of said second output signal and said real current signal; and means for producing control signals for controlling the operation of said second converter, including an input for receiving said fourth output signal.

9. Static energy regulator according to claim 8, wherein the means for producing control signals for controlling the operation of said first converter includes a hysteresis controller.

10. Static energy regulator according to claim 9, wherein the means for producing control signals for controlling the operation of said second converter includes a hysteresis controller.

11. Static energy regulator according to claim 10, wherein the first converter and the second converter include semiconductor devices triggered by said control signals.

12. Static energy regulator according to claim 11, wherein the first converter and the second converter comprise voltage source method converters having high frequency pulse width modulation.

13. Static energy regulator according to claim 12, wherein the first reference signal is a sinusoidal reference signal.

* * * * *